June 1, 1937.    F. BAZZI    2,082,439

MEANS FOR CONGEALING LIQU]

Filed June 22,

Federico Bazzi  INVENTOR

BY
*Louis L. Ansart*
his  ATTORNEY

Patented June 1, 1937

2,082,439

UNITED STATES PATENT OFFICE 2,082,439

MEANS FOR CONGEALING LIQUIDS

Federico Bazzi, Milan, Italy

Application June 22, 1934, Serial No. 731,867
In Italy August 1, 1933

1 Claim. (Cl. 62—114)

This invention relates to methods of and means for concentrating liquids or solutions such as new or unfermented wine, fruit juices and liquids with alcoholic content, and more particularly to the continuous carrying out of such concentration by the use of refrigeration.

An important object of the invention is to provide an improved method whereby such concentration may be carried out continuously and in an effective and economical manner. Another object is to provide efficient and economical means for carrying out said method.

Preferably the invention is carried out by use of an apparatus which permits continuous and uninterrupted concentration and enables easy regulation of the degree of concentration while at the same time enabling the reduction of the losses to a minimum. This may be done by the use of a rotating cooling unit maintained at low temperature and revolved so as to pass through liquid to be concentrated. When withdrawn from the fluid to be concentrated the ice or snow carrying concentrated solution is continuously removed from the cooling unit and the liquid is removed from the snow or ice crystals in any suitable manner as by the utilization of centrifugal force.

A preferred form of apparatus for carrying out the invention includes as an important part a freezer, refrigerator or cooling unit continuously rotated for the production of an ice mixture thereon, the ice crystals thus formed being of greatly reduced dimensions to prevent the inclusion of liquid drops in the ice crystals as would be the case with slow freezing. The freezing is very rapid due to the ready exchange of heat between the moving cooling surface and the liquid. The frost or snow formed on the cooling unit is continuously removed therefrom as soon as it is withdrawn from the liquid to be concentrated and consequently the rate of freezing is not reduced as it would be if the frost or snow on the cooling unit were carried back into the liquid to be concentrated.

The mixture of ice crystals and concentrated liquid formed on the moving cooling or freezing surface may be removed therefrom by suitable means such as a scraping device and delivered to a conveyor by which it is carried to a separating device which may be of a centrifugal type.

Other features and advantages will appear upon consideration of the following description and of the drawing, in which Fig. 1 is a diagrammatic side elevation of a preferred form of apparatus for carrying out the invention;

Figure 1:
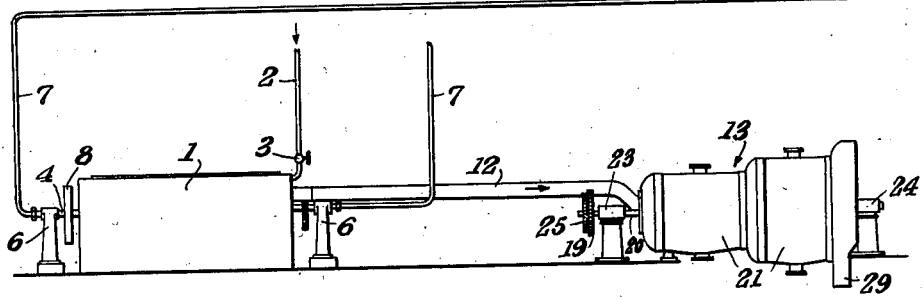
Figure 2:
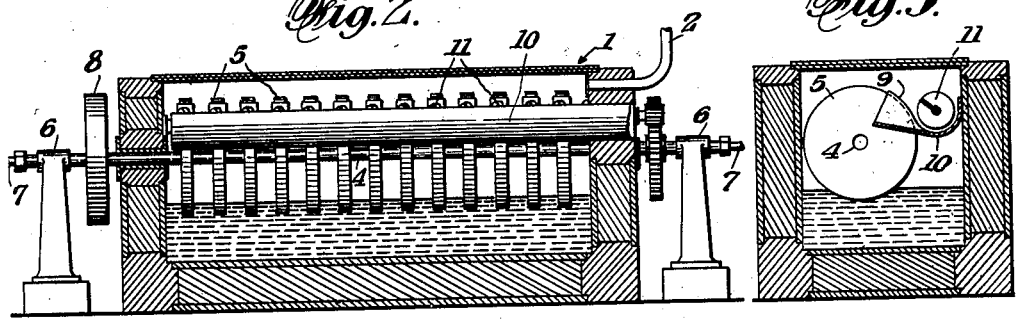
Fig. 2 is a sectional view, on a larger scale, of the cooling unit of Fig. 1.
Figure 3:
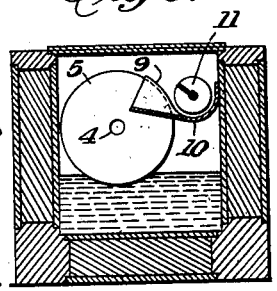
Fig. 3 is a cross section of the apparatus shown in Fig. 2.

Referring to the drawing, the liquid to be concentrated is introduced into a closed tank 1 through a pipe 2 provided with a valve 3. Said tank 1 extends in a generally horizontal direction and is provided with a rotary refrigerating or freezing device comprising a hollow shaft 4 and a plurality of hollow drums 5 arranged at intervals therealong so as to dip into liquid in the lower part of the tank. The shaft 4 is mounted in bearings 6 and is connected at its ends with tubes or pipes 7 by means of which brine at low temperatures may be circulated through the hollow shaft 4 and the drums 5. The drums 5 may be rotated by means of a pulley 8 on the shaft 4.

As the drums rotate, ice crystals of small size are formed thereon and together with concentrated fluid resulting from removal of water to form the ice crystals, are raised from the water. The ice mixture is removed continuously by suitable means such as a scraper device 9 shaped to remove the ice mixture or frost from the peripheries and sides of the drums. The removed mixture or frost composed of ice crystals, or snow, and concentrated fluid is discharged into a trough 10 which may be a part of the scraper device. By suitable means such as a conveyor screw 11 the material is fed along the trough and discharged into a pipe 12 through which it is passed to a centrifugal device 13.

The centrifugal device may be of any suitable form and as here illustrated is constituted principally by two cylinders 14 and 15, of progressive increase in diameter, rotated about a generally horizontal axis by suitable means. The charging and discharging of the treated material may be automatic. The cylinders 14 and 15 are perforated with openings for the expulsion of the concentrated liquid and are furnished at their interiors with screens 16 preferably metallic, which act to prevent the passage of the ice crystals with the concentrated liquid. The mixture to be treated in the centrifugal separating device enters the cylinder 14 of smaller diameter where it is acted upon by blades or paddles 17 turning about the common axis of the cylinders 14 and 15 at a greater speed than the cylinder 14 and acting to beat and to transport the mixture through the said cylinder 14 toward the cylinder 15 through which the snow or mass of ice crystals is advanced by blades or paddles 18 of greater length than paddles 17.

Figure 4:
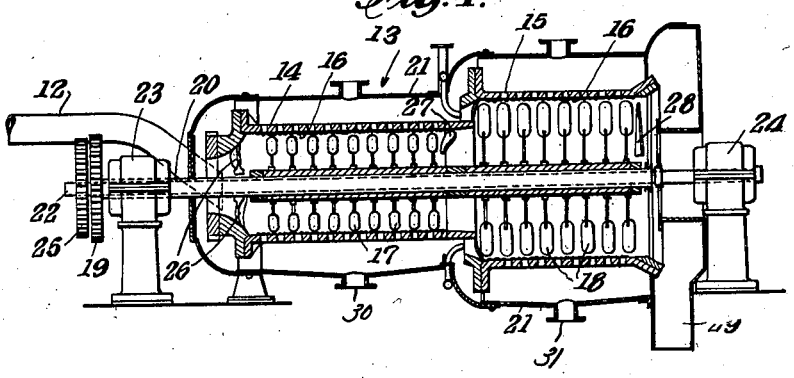
Fig. 4 is a longitudinal section of the separating apparatus, shown at the right of Fig. 1.

The rotation of the paddles or blades 17 and 18 may be effected by means of a rotary member or gear 19 on a shaft 20 carrying the two sets of blades. The blades acting on material in the cylinders tend to turn the cylinders in their supports in the casing 21 but at somewhat slower speed. The cylinders 14 and 15 can, however, be turned by any suitable means independent of the driving means for the blades. For example, the cylinders may be driven by a shaft 22 passing through the shaft 20, which for this purpose is made hollow, and connected with the right hand end (Fig. 4) of the larger cylinder 15 in a suitable manner. With this arrangement the hollow shaft 20 is journalled in a bearing 23 (see left of Fig. 4) and the shaft 22 is journalled in a bearing 24 (see right of Fig. 4). The shaft 22 may be driven by a rotary member or gear 25 adjacent to the pulley 19. It should be understood that pulleys may be used in place of the gears 19 and 25.

The mixture from the pipe 12 is fed into the end of the revolving part, including the cylinders 14 and 15, at one side of the shaft 20, and is advanced into the cylinder 14 by means including inclined blades 26. The mixture is fed from the cylinder 14 to the cylinder 15 by means including one or more inclined blades 27, and the ice crystals or snow are discharged from the cylinder 15, by means including one or more inclined blades 28, into a discharge duct 29. During the passage of the mixture through the cylinders 14 and 15, the concentrated liquid thrown out by centrifugal action is collected in the outer casing and drained out of it through ducts 30 and 31.

The crystallized mass is submitted, in the cylinder 14, to a prolonged centrifugal action that may be regulated in accordance with the speed of translation produced by the arrangement and speed of rotation of the blades or paddles 17. In course of time the mass passes into the larger cylinder 15 in which the tangential speed is greater and the final drops of liquid are discharged, and the paddles 18 gradually advance the mass through this cylinder and finally discharge the snow which is substantially completely deprived of its original content of materials such as sugar and alcoholic products.

The regulation of the system is very simple in that it is necessary only to regulate the valve 3, through which the liquid to be concentrated is admitted into the main tank 1, so that the snow expelled by the centrifugal action may be reduced to the desired degree. For example, if the alcoholic content of the snow is too strong, it is necessary only to reduce the delivery of liquid at the entrance, and, if to the contrary one judges that the percentage of the snow is sufficiently low, it is necessary to increase the delivery up to a tolerable percentage.

The illustrated embodiment of the apparatus of the present invention has the advantage that it may be started and brought into full operation in a very short time, whereas with freezing in fixed troughs it is necessary to wait for hours for the liquid mass to be frozen and finally it is necessary to centrifuge with an intermittent discharge centrifugal separator, so that there are appreciable losses in time and power and probable variation in efficiency in successive operations.

In the continuous freezing machine of the present invention the time necessary for furnishing the separation of the concentrated juice from the snow, after starting with the original liquid, varies between fifteen and twenty minutes. Furthermore the process of freezing can be stopped or started instantly, and the losses are reduced to a minimum and in any event are not augmented by the increase in quantity treated, as would be the case in the other systems where the losses are strictly proportional to the quantity treated. Machines adapted for continuous operation permit the working of large masses with a machine of low power.

It should be understood that various changes may be made and that certain features may be used without others without departing from the true spirit and scope of the invention.

Having thus described my invention, I claim:

The combination of a tank, a rotary cooling element turning about a horizontal axis and including a hollow shaft and hollow disks thereon communicating with the interior of the shaft to enable the passage of cooling liquid therethrough, said hollow disks dipping into liquid in said tank so as to lift material congealed on the disks out of the liquid and carry it over the shaft, a trough at the downwardly moving side of the rotary cooling element to receive congealed material and guide it through an end of the tank, a conveyor to discharge the congealed material from said trough, and scrapers to remove congealed material from downwardly moving sides and edges of said disks and direct it into said trough.

FEDERICO BAZZI.